US 9,654,891 B2

(12) United States Patent
Murrells et al.

(10) Patent No.: US 9,654,891 B2
(45) Date of Patent: May 16, 2017

(54) SYSTEM AND METHOD FOR DETERMINING PROXIMITY OF A CONTROLLER TO A MEDIA RENDERING DEVICE

(71) Applicant: D&M Holdings, Inc., Kanagawa (JP)

(72) Inventors: Nicholas Murrells, San Diego, CA (US); Brendon Stead, Carlsbad, CA (US); Peter Celinski, Los Gatos, CA (US); Anders Brogestam, Turramurra (AU)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 14/854,633

(22) Filed: Sep. 15, 2015

(65) Prior Publication Data
US 2017/0078813 A1 Mar. 16, 2017

(51) Int. Cl.
*H04R 29/00* (2006.01)
*G06F 3/16* (2006.01)
*G06F 17/30* (2006.01)

(52) U.S. Cl.
CPC .......... *H04R 29/004* (2013.01); *G06F 3/162* (2013.01); *G06F 3/165* (2013.01); *G06F 17/30053* (2013.01)

(58) Field of Classification Search
CPC ....... H04R 29/004; G06F 3/162; G06F 3/165; G06F 17/30053
USPC .............. 352/27; 360/72.2; 381/80, 332, 56; 455/426.1; 701/514; 707/4, 769; 709/202; 725/13, 36, 10, 133; 726/30; 348/14.04
See application file for complete search history.

(56) References Cited

U.S. PATENT DOCUMENTS

| | | | |
|---|---|---|---|
| 4,641,208 A * | 2/1987 | Inazawa | G11B 20/10527 360/32 |
| 5,255,322 A | 10/1993 | Farinelli et al. | |
| 5,606,624 A * | 2/1997 | Damato | H04R 27/00 340/4.42 |
| 6,574,592 B1 | 6/2003 | Nankawa et al. | |
| 7,068,972 B2 | 6/2006 | Tarr | |
| 7,346,512 B2 | 3/2008 | Wang et al. | |
| 7,394,519 B1 * | 7/2008 | Mossman | G03B 21/32 352/27 |
| 8,290,172 B2 | 10/2012 | Langella | |
| 8,699,862 B1 | 4/2014 | Sharifi et al. | |
| 2005/0273326 A1 | 12/2005 | Padhi et al. | |
| 2007/0239699 A1 * | 10/2007 | Murrells | G06F 17/30749 |
| 2008/0242222 A1 | 10/2008 | Bryce et al. | |

(Continued)

OTHER PUBLICATIONS

International Search Report and Written Opinion for PCT/US16/48876 dated Oct. 21, 2016.

*Primary Examiner* — Gerald Gauthier
(74) *Attorney, Agent, or Firm* — Peter A. Nieves; Sheehan Phinney Bass & Green PA

(57) ABSTRACT

A media rendering system includes a controller device and a media rendering device in communication via a communication network. The media rendering device is configured to render a media recording. The controller device includes a sensor configured to detect and receive an audio portion of the rendered media recording. The controller device is configured to identify the rendered media recording, and to determine a location of the controller device within a proximity of the media rendering device.

17 Claims, 7 Drawing Sheets

(56) References Cited

U.S. PATENT DOCUMENTS

| | | | |
|---|---|---|---|
| 2009/0088978 A1* | 4/2009 | Ishikawa | G01C 21/26 |
| | | | 701/514 |
| 2009/0216855 A1 | 8/2009 | Lang et al. | |
| 2010/0070987 A1* | 3/2010 | Amento | H04H 60/33 |
| | | | 725/10 |
| 2010/0093393 A1 | 4/2010 | Graef | |
| 2010/0315480 A1* | 12/2010 | Kahn | H04L 67/306 |
| | | | 348/14.04 |
| 2010/0333163 A1* | 12/2010 | Daly | H04N 5/4403 |
| | | | 725/133 |
| 2011/0078729 A1* | 3/2011 | LaJoie | G11B 27/28 |
| | | | 725/36 |
| 2012/0099594 A1 | 4/2012 | Lau et al. | |
| 2012/0239175 A1 | 9/2012 | Mohajer et al. | |
| 2013/0331087 A1 | 12/2013 | Shoemaker et al. | |
| 2013/0343568 A1 | 12/2013 | Mayman et al. | |
| 2014/0146980 A1 | 5/2014 | Jacobs | |
| 2014/0242913 A1 | 8/2014 | Pang | |
| 2014/0254820 A1* | 9/2014 | Gardenfors | H04R 3/005 |
| | | | 381/80 |
| 2014/0274031 A1* | 9/2014 | Menendez | H04W 52/0209 |
| | | | 455/426.1 |
| 2014/0280450 A1* | 9/2014 | Luna | H04W 4/008 |
| | | | 709/202 |
| 2014/0283140 A1* | 9/2014 | Gorman | G06F 21/62 |
| | | | 726/30 |
| 2014/0334669 A1 | 11/2014 | Acharya | |
| 2015/0186511 A1* | 7/2015 | Trollope | G06F 17/30755 |
| | | | 707/769 |
| 2015/0195649 A1 | 7/2015 | Vogt | |
| 2016/0021412 A1* | 1/2016 | Zito, Jr. | H04N 21/251 |
| | | | 725/13 |
| 2016/0219012 A1* | 7/2016 | Liao | H04L 51/20 |
| 2017/0034579 A1* | 2/2017 | Caudell | H04N 21/4542 |

* cited by examiner

SYSTEM AND METHOD FOR DETERMINING PROXIMITY OF A CONTROLLER TO A MEDIA RENDERING DEVICE

FIELD OF THE INVENTION

The present invention relates to media rendering, and more particularly, is related to controlling media rendering devices.

BACKGROUND OF THE INVENTION

Identification of a recorded song using a computing device with a microphone is known. For example, smartphone based applications ("apps") such as "Shazam" and "SoundHound" may sample a portion of audio and identify the recording or the composition.

It has become commonplace for an individual to have access to one or more devices that render media, such as an mp3 player, a car stereo, a home entertainment system, a portable computer or tablet, a gaming console, and a smart phone, among others. The rendering devices may have access to a communication network and/or the internet, and may be configured to render digital media provided over the communication network and/or the internet, for example, a digital media streaming service.

While device specific remote control devices have been available for such media rendering devices, so-called "universal" remote controllers are becoming more common, as well as platform based applications hosted by portable controller devices, such as a smart phone or tablet which may control one or more rendering devices.

However, associating a controller device with a rendering device may be cumbersome, for example, where a code identifying the rendering device is entered into the controlling device. Further, there may be more than one rendering device that responds to a specific controller code, making it more difficult to associate the controller with the desired rendering device. Therefore, there is a need in the industry to address one or more of the abovementioned shortcomings.

SUMMARY OF THE INVENTION

Embodiments of the present invention provide a system and method for determining proximity of a controller to a media rendering device. Briefly described, the present invention is directed to a media rendering system including a controller device and a media rendering device in communication via a communication network. The media rendering device is configured to render a media recording. The controller device includes a sensor configured to detect and receive an audio portion of the rendered media recording. The controller device is configured to identify the rendered media recording, and to determine a location of the controller device within a proximity of the media rendering device.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

Figure 1:
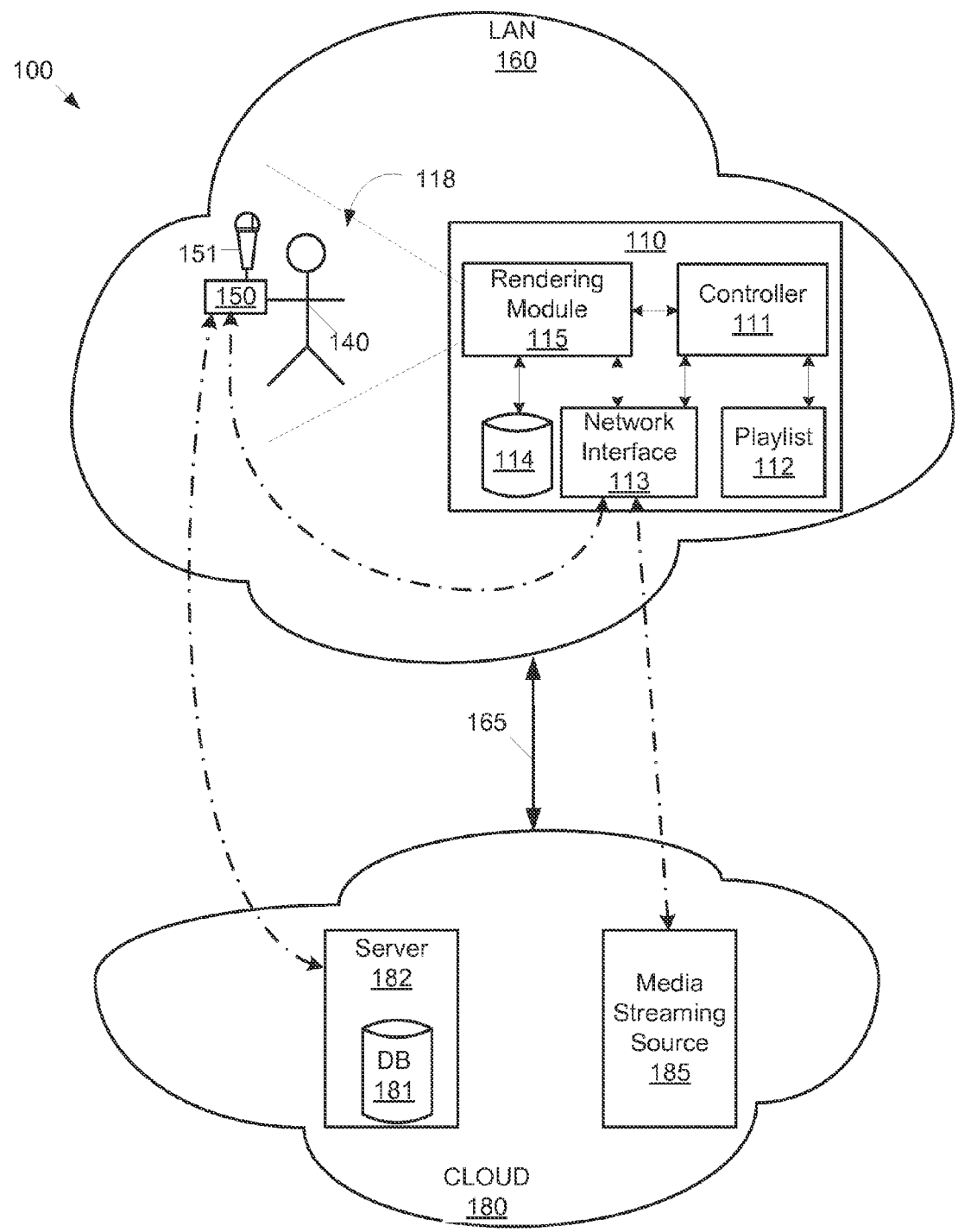
FIG. 1 is a schematic diagram depicting a first embodiment of a media rendering system.

The following definitions are useful for interpreting terms applied to features of the embodiments disclosed herein, and are meant only to define elements within the disclosure.

As used within this disclosure, "media" refers to audio and/or video content either stored on a storage medium, such as a disk drive or digital disk, or streamed from a media server. Media may refer to analog and/or digitally formatted data. A specific recorded performance is referred to as a media recording.

As used within this disclosure, an originating provider of media, either streamed or locally stored, is referred to as a "media source." Examples of a media source include a music and/or video server, an internet radio station, a streaming service, or a cache of media files.

As used within this disclosure, "rendering" refers to playback of media by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system. A rendering device generally includes at least one audio transducer (speaker) used to render the media audio portion, or a wired connector or wireless capability for attaching at least one audio transducer.

As used within this disclosure, a "user" refers to a person consuming media from a rendering device.

As used within this disclosure, a local device refers to a network element directly connected to a local area network (LAN), while a remote device, such as a server, refers to an item that may be in communication with local network elements, for example, via the internet, but is not directly connected to the LAN.

As used within this disclosure, a "playlist" is a modifiable data structure containing an ordered list of media, or an ordered list of references to media. A playlist may be stored, for example, on a rendering device or a server. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others.

As used within this disclosure, "streaming" refers to a process of real-time transmitting media of a recording by a source to a rendering device. The rendering device may begin rendering the media before the entire recording has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming audio media.

As used within this reference, "operating manner" refers to the operation of a device according to a specified configuration of one or more operating parameters and/or rendering of specified media.

As used within this reference, "proximity" refers to a distance, or a distance range between a detected object and a proximity detecting device. The distance range may be a function of orientation with respect to the proximity detecting device.

Reference will now be made in detail to embodiments of the present invention, examples of which are illustrated in the accompanying drawings. Wherever possible, the same reference numbers are used in the drawings and the description to refer to the same or like parts.

Generally, embodiments of the present invention include one or more rendering devices in communication with one another, and in communication with one or more controlling device. Each rendering device renders media provided by a media source, for example, stored within the rendering device or via a communication network. Each rendering device plays media in a playlist, or from a media stream. One or more rendering device may be located within a premises such as a dwelling or business, for example, in separate rooms. Control of the one or more rendering devices and/or the selection of media rendered by the one or more media devices may be determined based on a proximity of a controlling device to the one or more media devices as detected by the one or more controlling devices.

FIG. 1 shows a first exemplary media rendering system 100. The system 100 includes a rendering device 110 configured to render audio and/or video through a rendering module 115. For example, the rendering module 115 may include an audio amplifier and one or more audio transducers to render at least the audio portion of media which may be heard in a listening region 118 in the proximity of the rendering device 110. A rendering device controller 111 may be, for example, a computer, configured to receive commands from a user interface such as a remote control device or a front panel interface. The rendering device controller 111 is configured to control the rendering module 115, for example, selecting media for rendering, and determining rendering parameters, such as volume and tone, among others.

The rendering module 115 is configured to render media from one or more media sources. The rendering module 115 may render a locally stored media source, for example, media recordings stored within local (or internal) storage 114, such as flash storage or a hard drive. The rendering module 115 may render an audio stream rendered by an external device, for example, a radio tuner or a phonograph player connected to the rendering device via one or more audio and/or video ports (not shown).

The rendering device 110 may include a network interface 113 in communication with a network 160, for example, a wired and/or wireless local area network (LAN). The network interface 113 may be configured to communicate with one or more controller devices 150, or to communicate with a media streaming source 185, for example, a media streaming source 185 based in the cloud 180, which is connected to the LAN 160 via an internet connection 165, for example, a wireless internet router (not shown) in the LAN 160. The rendering module 115 may then render a media stream received by the network interface 113 and conveyed from the network interface 113 to the rendering module 115.

The rendering device controller 111 may select media for rendering from a locally stored playlist 112, or from a remotely stored playlist, for example, a playlist stored in a database 181 accessed by a server 182 in the cloud 180. Examples of a rendering module 115 include a networked home entertainment center. The rendering device 110 may communicate with other rendering devices via the LAN 160. Other device controllers 150 may communicate with the rendering device 110 directly or via the LAN 160.

A user 140 carries a controller device 150, for example, a smart phone or a tablet computer, into a listening region 118 of the rendering device 110. The user 140 has the controller device 150 on his person. For example, the user 140 may carry the controller device 150, such as a tablet computer or a smart phone configured to communicate with the controller device 150. The user 140 may be holding the controller device 150 in his hand, carrying the controller device 150 in his pocket, or may be wearing the controller device 150 on his clothing, for example, on his belt.

The controller device 150 may be in communication with the LAN 160. The rendering device 110 and the controller device 150 may be in communication, for example, via a direct hard wired communication channel, or via a wireless communication channel, such as a BlueTooth, Bluetooth Low Energy (BLE), ZigBee, WiFi, or other radio frequency (RF) channel via the LAN 160.

The controller device 150 includes an audio sensor 151 able to detect the audio portion of the media recording rendered by the rendering device 110. For example, the controller device 150 may be a cell phone, and the audio sensor 151 may be the cell phone microphone. The audio sensor 151 may be integral to the controller device 150, or may be in communication with the controlling device, for example, via a hard wired connection or a wireless connection.

The controller device 150 samples a portion of audio from the rendered media recording, and identifies the media recording being rendered. For example, the controller device 150 may communicate with the cloud based server 182 to determine the identity of the media recording being rendered by the rendering device 110. Since the controller device 150 is now aware it is in the proximity of a rendering device 110, the controller device 150 may then discover which rendering device 110 is rendering the media recording, and deduce its own location based on the location of the rendering device 110 that is rendering the media recording. For example, if one rendering device 110 is rendering a media recording, the controller device 150 becomes aware it is in the proximity of the rendering device 110 by recognition of the media recording. If more than one rendering device 110 is rendering the media recording, the controller device 150 may measure the audio propagation delay of the rendered media recording from each individual rendering device 110 to determine the location of the audio sensor 151 in relation to the rendering device 110 by triangulation (time difference of arrival).

Perhaps the simplest example would be of the rendering device 110 rendering a test pattern. The controller device 150 is carried into the listening region 118, and the audio sensor 151 on the controller device 150 senses the test pattern. The controller device 150 then identifies the test pattern, and may conclude that the controller device 150 is in the proximity of a rendering device 110. If there is more than one rendering device 110 rendering the test pattern, the controller device 150 may distinguish the rendering devices 110 rendering the test pattern using time difference of arrival, as described above.

Figure 2A:
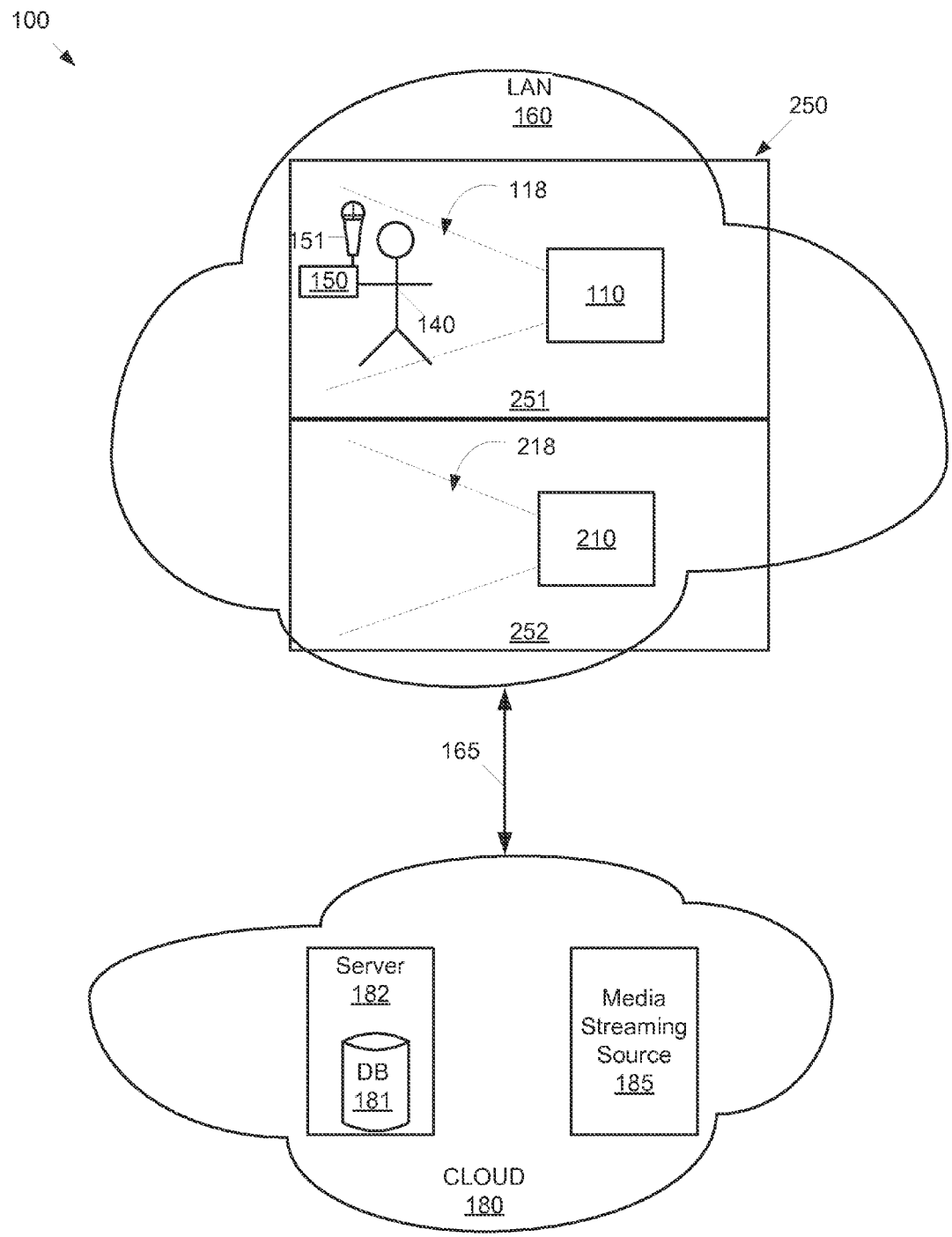
FIG. 2A is a schematic diagram depicting a second embodiment of a media rendering system deployed within a premises.

As shown by FIG. 2A, the rendering device 110 may be located within a premises 250 such as a dwelling or business. The rendering device 110 may be rendering media from the playlist 112 (FIG. 1) of the rendering device 110. The controller device 150 is configured to identify the rendering device 110 based on the media recording the rendering device 110 is rendering. For example, when the user 140 enters a first room 251 where a rendering device 110 is located, the controller device 150 detects the media recording being rendered by the rendering device 110, identifies the media recording being rendered, and determines if the rendering device 110 within the premises is presently rendering the identified media recording. If the rendering device 110 within the premises is presently rendering the identified media, the controller device 150 deduces that the user 140 is in the proximity of the identified rendering device 110. The controller device 150 may then configure itself to control the identified rendering device 110 as the preferred or priority default rendering device 110. Alternatively, the controller device 150 may configure itself to control any detected rendering device 110 in proximity to the controller device 150.

Figure 2B:
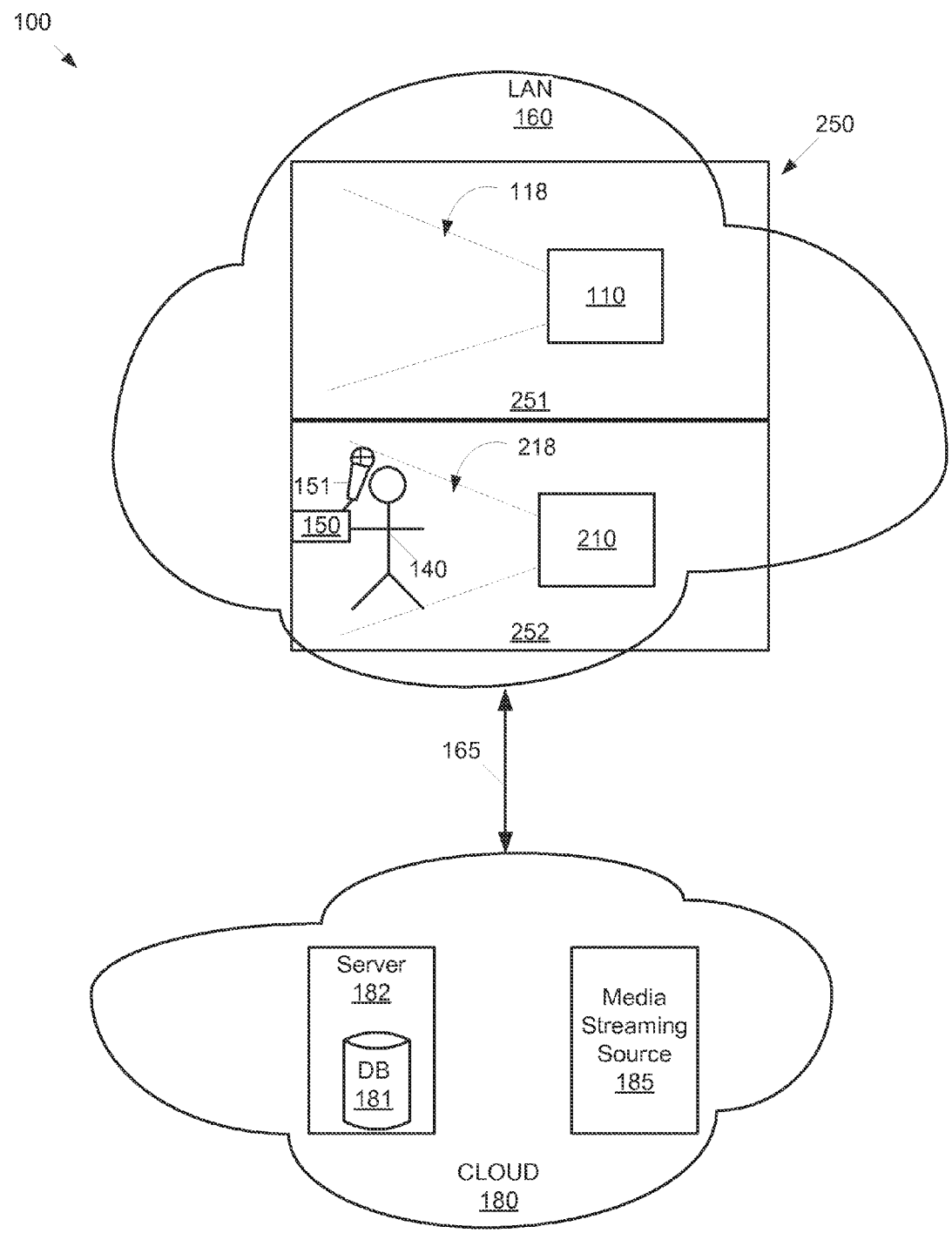
FIG. 2B is a schematic diagram depicting the second embodiment of the media rendering system of FIG. 2A showing the user in a different region.

Conversely, when the controller device 150 no longer detects media being rendered by the rendering device 110, the controller device 150 may generate a command, for example, to turn off the previously detected rendering device 110, or to turn on a second rendering device 210 within the premises 250, as shown in FIG. 2B. The second rendering device 210 may be within a second room 252 within the premises 250. A listening region 218 of the rendering device 210 is in the proximity of the rendering device 210.

Each rendering device 110, 210 may be rendering media from a separate playlist 112 (FIG. 1). For example, the first rendering device 110 in the first room 251 may be rendering a first media recording from the playlist 112 (FIG. 1) of the first rendering device 110, and the second rendering device 210 in the second room 252 may be rendering a second media recording from the playlist 112 (FIG. 1) of the second rendering device 210. The controller device 150 determines its approximate location within the premises 250 by identifying the rendering device 110, 210 rendering the media recording the controller device 150 detects. A room 251, 252 may have zero, one, two, or more rendering devices 110, 210, where each rendering device 110, 210 may include two or more audio transducers that are controlled as one, for example, a stereo pair, or a surround sound speaker system.

Alternatively, rendering devices 110, 210 in multiple rooms 251, 252 may be rendering the same media simultaneously. The controller device 150 may determine which rendering device 110, 210 is closest, for example, by measuring audio delay (time difference of arrival), to determine which rendering device 110, 210 to control or give priority to.

The controller device 150 may convey commands to the rendering device 110 to configure the rendering characteristics of the rendering device 110. The commands may reflect an audio rendering characteristic, for example, but not limited to, choice of media, volume level, balance, and/or an equalization (tone) curve, a number of audio channels (e.g., one channel for mono or two channels for stereo), and/or an audio speaker configuration (e.g., surround sound speaker configurations with or without a subwoofer, center channel, side and/or rear speakers). Rendering commands may also or instead reflect a video rendering preference of the user 140, for example, but not limited to, a video brightness setting, a video color ratio/pallet, a video resolution (e.g., standard definition v. high definition), a video aspect ratio, or three dimensional (3D) video, among others.

The controller device 150 may determine its location in part based upon access to information regarding the media recording being rendered by one or more media rendering devices 110, 210 known to be in communication with the LAN 160.

For example, the controller device 150 may detect media being rendered and determine the identity of the recording being rendered, for example, by using a media identifying utility. The controller device 150 may then communicate with the rendering devices 110, 210 in communication with the LAN 160 to determine which of the rendering devices 110, 210 includes the identified media in the playlist 112 (FIG. 1) of the rendering device 110, 210. If only one of the rendering devices 110, 210 includes the identified media in the playlist 112 (FIG. 1), the controller device 150 may determine it is in the vicinity of the rendering device 110, 210 which includes the identified media in the playlist 112 (FIG. 1).

However, if more than one of the rendering devices 110, 210 includes the identified media in the playlist 112 (FIG. 1), more information may be needed to determine which of the rendering devices 110, 210 the controller device 150 is detecting. For example, the controller device 150 may need to communicate with each of the rendering devices 110, 210 on the LAN 160 to determine which, if any, of the rendering devices 110, 210 is presently rendering the identified media. If only one of the rendering devices 110, 210 is presently rendering the identified media, the controller device 150 may determine it is in the vicinity of the rendering device 110, 210 which is currently rendering the identified media.

The system 100 may also be used to determine proximity of a controller device 150 to a media rendering device 110, 210 that is presently rendering a media streaming source 185, for example, a cloud based media streaming service. As with the above example, the controller device 150 may detect media being rendered and determine the identity of the recording being rendered, for example, by using a media identifying utility. The controller device 150 may then communicate with the rendering devices 110, 210 in communication with the LAN 160 to determine which of the rendering devices 110, 210 is currently rendering a media streaming source 185. The controller device 150 may then communicate with the rendering devices 110, 210 and/or the media streaming source 185 to determine if the media streaming source 185 is presently streaming the identified media recording.

Similarly, the controller device 150 may query one or more media rendering devices 110, 210 for the identity of the media currently being rendered from other sources, for example, via a compact disc (CD), from a local music server, a connected hard drive or flash drive, among other sources. Once the controller device 150 has identified the media being rendered by the media rendering devices 110, 210 communicating with the LAN 160, the controller device 150 may determine if any of the presently rendered media matches the identified media.

Figure 3:
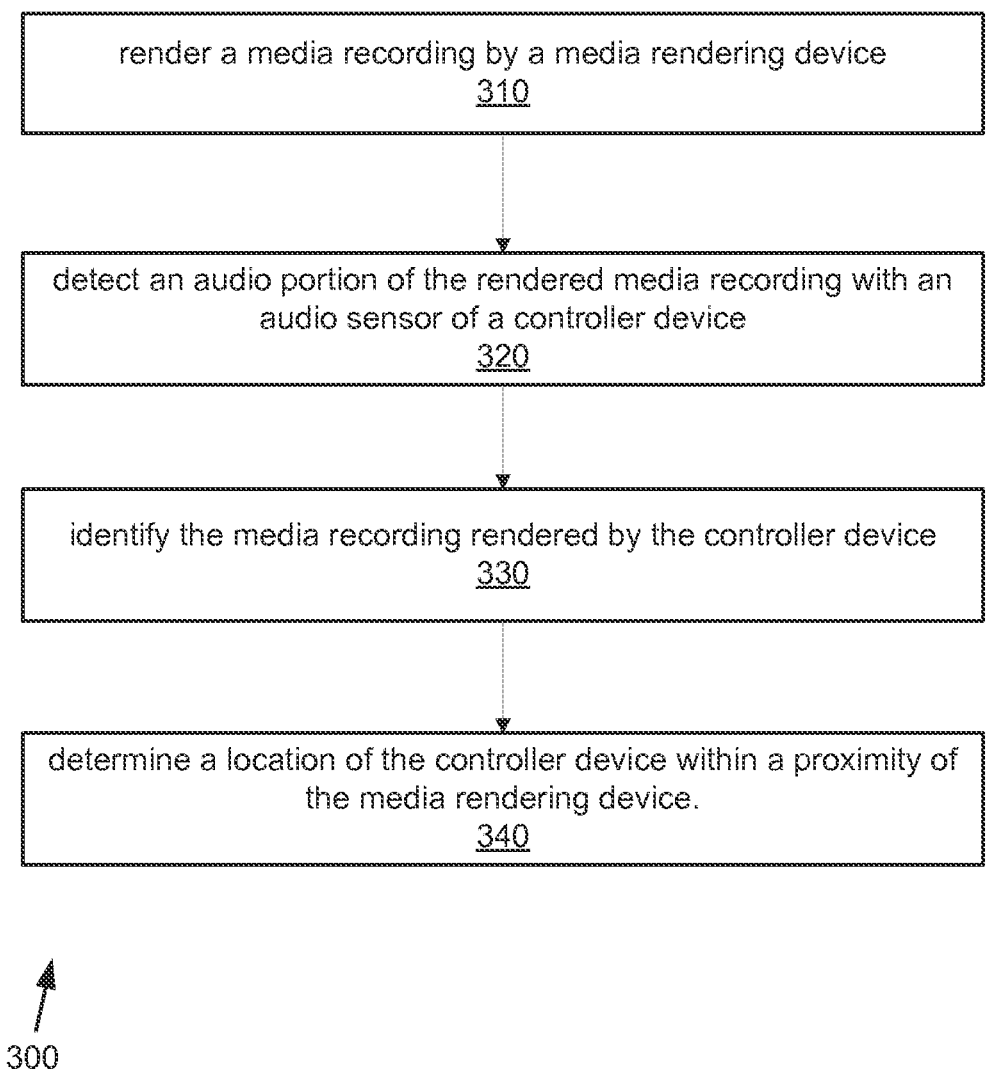
FIG. 3 is a flowchart of a first exemplary method for operating a media rendering system in a communication network.

FIG. 3 is a flowchart of an exemplary method 300 for operating a media rendering system in a LAN 160. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to elements shown in FIGS. 2A-2B.

Under the first exemplary method 300, a media recording is rendered by a media rendering device 110, as shown by block 310. An audio portion of the rendered media recording is detected with an audio sensor 151 of a controller device 150, as shown by block 320. For example, the controller device 150 may be a smart phone, and the audio sensor 151 may be a microphone of the smart phone. The rendered media recording is identified by the controller device 150, as shown by block 330. For example, the audio sensor 151 may sample a portion of the rendered audio of the media recording as rendered by the media rendering device 110, and identify the media recording, for example, using a known audio identification method, such as an acoustic fingerprint. The controller device 150 may use an internal processor to identify the media recording, or may convey a portion of the sampled audio to a server, for example, a remote server 182 available via the LAN 160, where the identification is performed by the remote server, and the identity of the media recording is conveyed to the controller device 150 by the remote server 182.

A location of the controller device 150 is determined to be in the proximity of the media rendering device 110, as shown by block 340. For example, the controller device 150 may determine that it is within a proximity of the media rendering device 110 based on knowing the media rendering device 110 is rendering the same media recording the controller device 150 is sensing. The controller device 150 may further determine a distance between the controller device 150 and the media rendering device 110 based on a time delay between a time of rendering the media recording by the media rendering device 110 and a time of receiving the audio portion of the media recording by the controller device 150. For example, the controller device 150 may determine the delay and then calculate the distance between the controller device 150 and the media rendering device 110 based on the speed of sound.

The location of the media rendering device 110 may be predetermined, or may be discovered. For example, a predetermined location of the media rendering device 110 may be stored within the media rendering device 110, as configured by a user of the media rendering device 110. For example, the predetermined location of the media rendering device 110 may be stored in a text field in a memory of the media rendering device 110. The text field may indicate a relative location, for example, "living room," "bedroom," or a more specific location, for example, "living room at 1600 Pennsylvania Avenue Northwest, Washington, D.C. 20500, USA."

Alternatively, the location of the media rendering device 110 may be discovered, for example, using location functionality, such as Global Positioning Service (GPS) within the media rendering device 110 or the controller device 150. The location may be a concatenation of the predetermined address and the discovered address. For example, the predetermined text field stored within the media rendering device 110 may be concatenated with the discovered location determined by the controller device 150.

Figure 4:
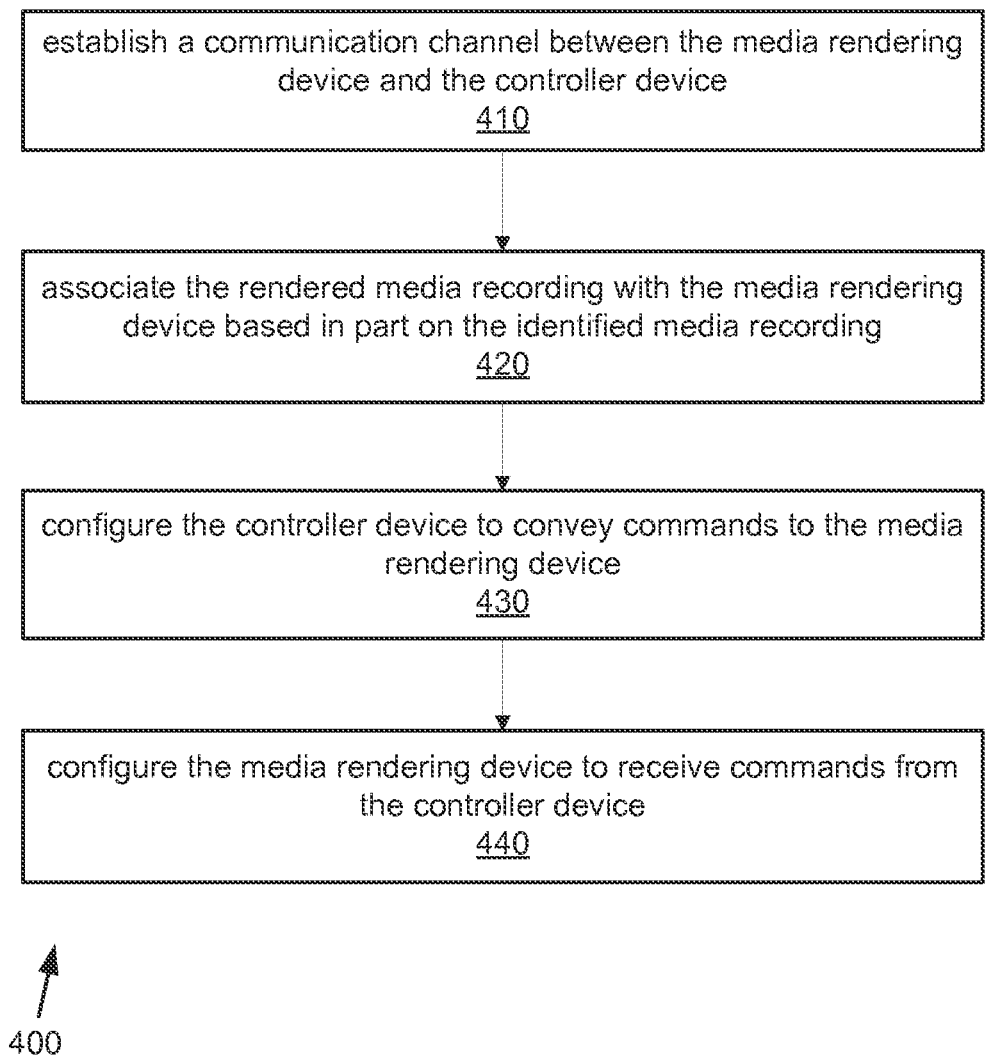
FIG. 4 is a flowchart of an optional continuation of the first exemplary method for operating a media rendering system in a communication network.

FIG. 4 is a flowchart of an optional continuation of the first exemplary method for operating a media rendering system 100 in a LAN 160. A communication channel is established between the media rendering device 110 and the controller device 150, as shown by block 410. For example, the communication channel may be via the LAN 160. Alternatively, the communication channel may be independent of the LAN 160, for example, using an ad hoc WiFi network, BlueTooth, ZigBee, or another communication method. The rendered media recording is associated with the media rendering device 110, for example, by the controller device 150, based in part on the identified media recording, as shown by block 420. Here, the controller device 150 uses the determined proximity between the media rendering device 110 and the controller device 150 to establish a controller relationship between the controller device 150 and the media rendering device 110.

The controller device 150 is configured to convey commands to the media rendering device 110, as shown by block 430. The media rendering device 110 is configured to receive commands from the controller device 150, as shown by block 440. For example, the controller device 150 may issue basic playback commands to the rendering device 110, such as stop, play, pause, rewind, fast forward, skip to next track, et cetera, to the media rendering device 110. The controller device 150 may also issue additional playback commands to the rendering device 110, such as volume level, speaker balance, and tone configuration (e.g., bass, middle, treble levels). The controller device 150 may also issue media selection commands to the rendering device 110, for example, editing the playlist 112 (FIG. 1), and determining a media input, for example, an auxiliary input, an internal playlist, or a received media stream, among others.

Figure 6:
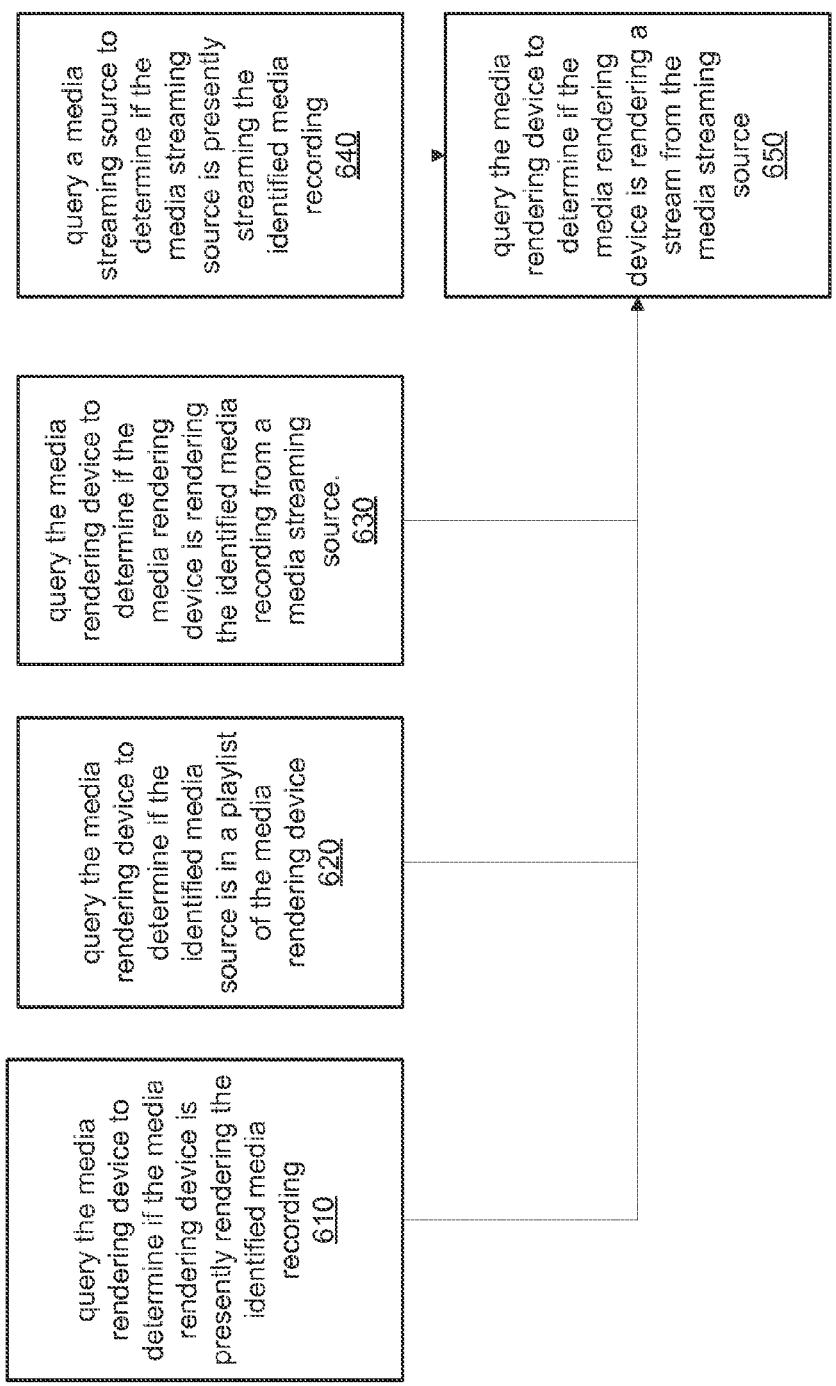
FIG. 6 is a flowchart of various optional steps for associating the identified rendered media with a media rendering device in the first exemplary method for operating a media rendering system in a communication network.

FIG. 6 is a flowchart of various optional steps for associating the identified rendered media with a media rendering device in the first exemplary method for operating a media rendering system in a communication network. Block 610 outlines a scenario where the media rendering device 110 is in communication with the controller device 150, and the media rendering device 110 is able to report the identity of the media presently being rendered. Here, the media rendering device 110 may be queried to determine if the media rendering device 110 is presently rendering the identified media recording, as shown by block 610. For example, the controller device 150 may transmit a broadcast message over the LAN 160 such that all media rendering devices 110, 210 respond with a message indicating the media recording presently being rendered, if any.

Alternatively, the controller device 150 may have previously learned the addresses of each of the media rendering devices 110, 210, and poll each of the media rendering devices 110, 210 individually to determine if one or more of the media rendering devices 110, 210 is presently rendering the identified media recording.

Alternatively, block 620 outlines a first scenario where the media rendering device 110 is in communication with the controller device 150, and the media rendering device 110 is rendering media according to a playlist 112 (FIG. 1). Here, the media rendering device 110 may be queried to determine if the identified media recording is in a playlist of the media rendering device 110.

Alternatively, block 630 outlines a second scenario where the media rendering device 110 is in communication with the controller device 150, and the media rendering device 110 is rendering media from a media streaming source 185. Here, the media rendering device 110 may be queried to determine if the media rendering device 110 is rendering the identified media recording from a media streaming source 185.

Alternatively, blocks 640-650 outline a third scenario where the media rendering device 110 is in communication with the controller device 150, and the media rendering device 110 is rendering media from a media streaming source 185. Here, the media streaming source 185 is queried to determine if the media streaming source 185 is presently streaming the identified media recording, as shown by block 640. The media rendering device 110 is queried to determine if the media rendering device 110 is rendering a stream from the media streaming source 185, as shown by block 650. The controller device 150 may determine from this information that the identified rendered media is being streamed to the rendering device 110 presently rendering the rendering a stream from the media streaming source 185 that the controller device 150 is in proximity to the media rendering device 110.

Figure 5:
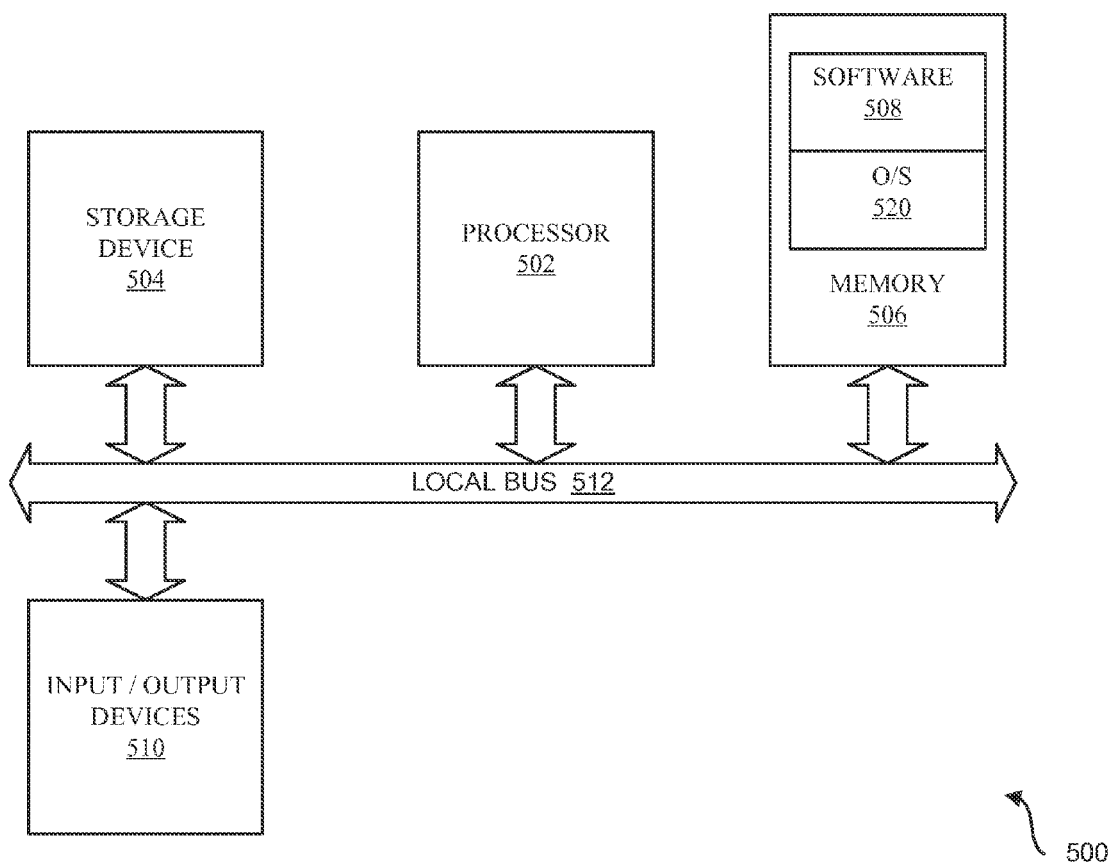
FIG. 5 is a schematic diagram illustrating an example of a system for executing functionality of the present invention.

As previously mentioned, the one or more devices such as the controller device and/or the rendering device of the present system for executing the functionality described in detail above may be or include a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communication. Further, the local interface 512 may include address, control, and/or data connections to enable appropriate communication among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a motion detector, a camera, a radio frequency (RF) detector, a keyboard, mouse, a pattern scanner, touchpad, microphone, etc. Furthermore, the I/O devices 510 may also include output devices, for example but not limited to, a printer, video display, audio transducer, etc. Finally, the I/O devices 510 may further include devices that communicate via both inputs and outputs, for instance but not limited to, a wireless transducer, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A media rendering system, comprising:
   a communication network;
   a controller device in communication with the communication network comprising a sensor configured to detect and receive an audio portion of a media recording; and
   a first media rendering device in communication with the communication network configured to render the media recording,
   wherein the controller device is configured to identify from the received audio portion the media recording rendered by the first media rendering device, and to determine from the received audio portion a location of the controller device within a proximity of the first media rendering device.

2. The system of claim 1, wherein the first media rendering device is one of a plurality of media rendering devices, and the controller device is further configured to identify the first media rendering device from the plurality of media rendering devices based at least in part by the identified media recording.

3. The system of claim 1, wherein the media recording rendered by the first media rendering device comprises an audio test pattern.

4. The system of claim 1, wherein the media recording rendered by the first media rendering device comprises a received media stream.

5. The system of claim 1, wherein the media recording rendered by the first media rendering device is selected from a playlist of the first media rendering device comprising a plurality of media recordings.

6. The system of claim 1, wherein the wherein the controller device is further configured to determine an association between the controller device and the first media rendering device based at least in part on the proximity of the first media rendering device.

7. The system of claim 6, wherein the wherein the controller device is further configured to convey commands to the first media rendering device.

8. The system of claim 6, wherein the wherein the first media rendering device is further configured to receive commands from the controller device.

9. A method for operating a media rendering system in a communication network, comprising the steps of:
   rendering a media recording by a media rendering device;
   detecting, with an audio sensor of a controller device, an audio portion of the media recording;
   identifying from the received audio portion, by the controller device, the media recording; and
   determining from the received audio portion a location of the controller device within a proximity of the media rendering device.

10. The method of claim 9, further comprising a step of establishing a communication channel between the media rendering device and the controller device.

11. The method of claim 10, further comprising a step of querying the media rendering device to determine if the media rendering device is presently rendering the identified media recording.

12. The method of claim 10, further comprising a step of querying the media rendering device to determine if a playlist of the media rendering device comprises the identified media recording.

13. The method of claim 10, further comprising a step of querying the media rendering device to determine if the media rendering device is rendering the identified media recording from a media streaming source.

14. The method of claim 10, further comprising the steps of:
   querying a media streaming source to determine if the media streaming source is presently streaming the identified media recording; and
   querying the media rendering device to determine if the media rendering device is rendering a stream from the media streaming source.

15. The method of claim 10, further comprising a step of associating the presently rendered media recording with the media rendering device based in part on the identified media recording.

16. The method of claim 15, further comprising a step of configuring the controller device to convey commands to the media rendering device.

17. The method of claim 15, further comprising a step of configuring the media rendering device to receive commands from the controller device.

* * * * *